(12) United States Patent
Parker et al.

(10) Patent No.: US 6,698,963 B1
(45) Date of Patent: Mar. 2, 2004

(54) BALL AND SOCKET JOINT AND METHOD THEREFOR

(75) Inventors: Eric G. Parker, Winnetka, IL (US); Jason K. Trotter, Des Plaines, IL (US); Eric David Ross Thompson, South Euclid, OH (US); Craig L. Simdon, Des Plaines, IL (US)

(73) Assignee: Illinois Tool Works Inc., Glenview, IL (US)

( * ) Notice: Subject to any disclaimer, the term of this patent is extended or adjusted under 35 U.S.C. 154(b) by 209 days.

(21) Appl. No.: 09/689,094

(22) Filed: Oct. 12, 2000

(51) Int. Cl.$^7$ ................................................ F16C 11/00
(52) U.S. Cl. ...................................... 403/130; 403/131
(58) Field of Search ................................ 403/131, 265, 403/269, 268, 122, 130, 135, 129, 267, 56

(56) References Cited

U.S. PATENT DOCUMENTS

| | | | | |
|---|---|---|---|---|
| 3,941,495 A | * | 3/1976 | Duncan ...................... 403/267 |
| 5,009,538 A | * | 4/1991 | Shirai et al. ................. 403/134 |
| 5,213,008 A | * | 5/1993 | Kanno et al. ............. 74/579 R |
| 5,313,697 A | * | 5/1994 | Kanno et al. ............... 29/527.4 |
| 5,352,059 A | * | 10/1994 | Ueno et al. .................. 403/122 |
| 5,615,967 A | * | 4/1997 | Hellon ........................ 403/133 |
| 5,641,235 A | * | 6/1997 | Maughan et al. ........... 403/133 |
| 5,860,757 A | * | 1/1999 | Sugiura ...................... 403/131 |
| 5,947,627 A | * | 9/1999 | Uneme et al. .............. 403/122 |
| 6,109,816 A | * | 8/2000 | Iwasaki ...................... 403/135 |
| 6,254,114 B1 | * | 7/2001 | Pulling et al. ......... 280/93.511 |

* cited by examiner

Primary Examiner—Lynne H. Browne
Assistant Examiner—Aaron Dunwoody
(74) Attorney, Agent, or Firm—Mark W. Croll; Paul F. Donovan

(57) ABSTRACT

A ball and socket joint in a vehicle control link and methods therefor including a ball with a connecting member coupled thereto disposed and pivotally retained in a socket by molding a plastic ball in the socket or by molding a plastic socket about the ball. The ball and socket joint may generally be formed of different materials, and in one embodiment the ball and socket joint is plastic formed by insert molding.

15 Claims, 3 Drawing Sheets

BALL AND SOCKET JOINT AND METHOD THEREFOR

BACKGROUND OF THE INVENTION

The invention relates generally to ball and socket joints, and more particularly to automotive control arm links having insert molded ball and socket joints.

An object of the present invention is to provide in some embodiments thereof novel ball and socket joints and vehicle control arm links, for example steering and suspension linking members, and methods therefor that overcome problems in and improve upon the prior art.

Another object of the invention is to provide in some embodiments thereof novel ball and socket joints and methods therefor that are economical and reliable.

Another object of the invention is to provide in some embodiments thereof novel ball and socket joints and methods therefor that are non-corrosive or at least have reduced corrosion.

Yet another object of the invention is to provide in some embodiments thereof novel ball and socket joints and methods therefor that are less susceptible to wear.

Another object of the invention is to provide in some embodiments thereof novel ball and socket joints and methods therefor that are less susceptible to contamination, for example by particulate matter or debris.

A further object of the invention is to provide in some embodiments thereof novel ball and socket joints and methods therefor that require little or no machining during manufacture.

Yet another object of the invention is to provide in some embodiments thereof novel ball and socket joints and methods therefor require little or no lubrication.

Another object of the invention is to provide in some embodiments thereof novel ball and socket joints and methods therefor having little or no tolerance stack-up.

A further object of the invention is to provide in some embodiments thereof novel ball and socket joints and methods therefor having improved performance.

Another object of the invention is to provide in some embodiments thereof novel ball and socket joints and methods therefor having improved angulation and/or rotation.

Another object of the invention is to provide in some embodiments thereof novel ball and socket joints and methods therefor having reduced mass and inertia.

Yet another object of the invention is to provide in some embodiments thereof novel ball and socket joints made of plastic materials, preferably in insert molding operations.

It is still another object of the invention to provide in some embodiments thereof novel ball and socket joints and methods therefor that are biased in a particular configuration, for example balls that tend to be self-centering in the socket.

Another object of the invention is to provide in some embodiments thereof novel ball and socket joints and methods therefor that are self-sealing without the requirement of sealing members, for example without plastic boot seals used in the prior art.

A further object of the invention is to provide in some embodiments thereof novel ball and socket joints and methods therefor that are discretely positionable.

A more particular object of the invention is to provide in some embodiments thereof novel vehicle control arm links and methods therefor comprising a plastic ball with a connecting member coupled thereto disposed and pivotally retained in a plastic socket.

Another more particular object of the invention is to provide in some embodiments thereof novel ball and socket combinations and methods therefor comprising a plastic ball molded and pivotally retained in a socket, or a plastic socket molded about a ball to pivotally retain the ball therein.

These and other objects, aspects, features and advantages of the present invention will become more fully apparent upon careful consideration of the following Detailed Description of the Invention and the accompanying Drawings, which may be disproportionate for ease of understanding, wherein like structure and steps are referenced generally by corresponding numerals and indicators.

DETAILED DESCRIPTION OF THE INVENTION

Figure 1:
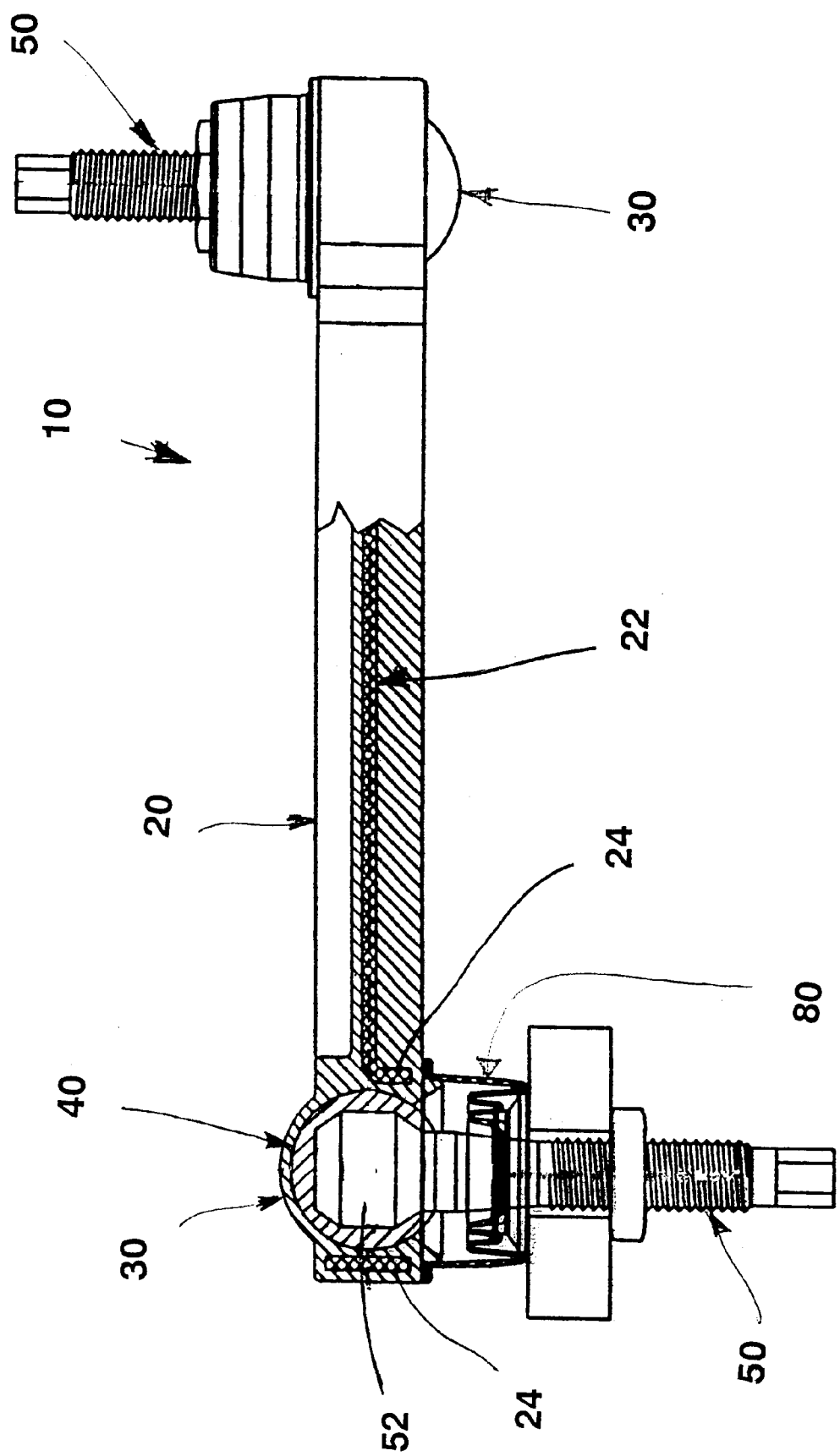
FIG. 1 is a partial sectional view of a ball and socket vehicle control arm link according to an exemplary embodiment of the invention.

FIG. 1 illustrates an exemplary vehicle control arm link, or linking member, 10 comprising a link body 20 having ball joints disposed on opposite ends thereof. In alternative embodiments, the linking member 10 may have only a single ball and socket joint associated therewith.

The ball and socket joints each comprise generally a socket 30 disposed on or formed as a part of the link body, and a ball 40 pivotally disposed and retained in the socket. The ball and socket joints also generally comprise a ball connecting member protruding from one or more sides of the corresponding ball for coupling to some other structure.

In FIG. 1, the exemplary ball connecting member is a threaded stud 50 protruding from the balls in the sockets 30 on opposite sides of the link body 20. In an alternative configuration, the studs may protrude from the same side of the link body. Other suitable ball connecting members are also known to those of ordinary skill in the art.

In one application, the linking member 10 of FIG. 1 interconnects components of an automotive suspension system, for example a stabilizer bar and a control arm or strut.

The linking member 10 and variations thereof and more generally the ball and socket joints of the present invention may be used in many other automotive and non-automotive applications.

Figure 3:
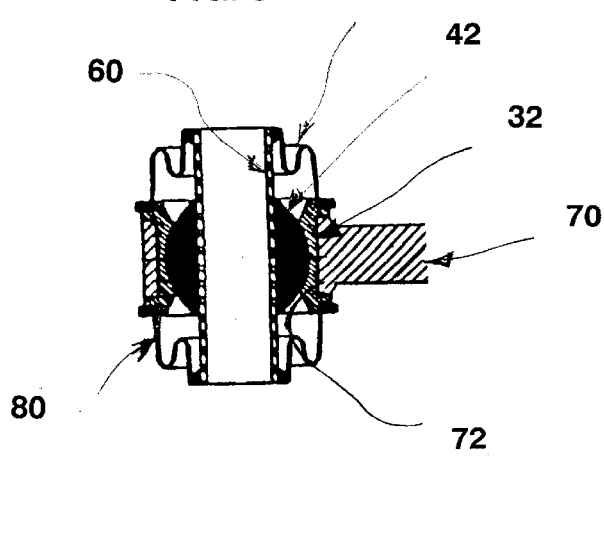
FIG. 3 is an alternative embodiment of the invention.

The ball and socket joint of FIG. 3 forms part of a Heim joint comprising a ball portion 42 pivotally disposed in a socket 32, which is captured in an opening 72 of a frame member 70, which is usually metal, as illustrated in the sectional view of FIG. 3. In FIG. 3, the ball connecting member is a hollow compression sleeve 60 extending through and from opposite sides of the ball, but it could take other forms.

Preferably, the ball is molded in the socket or the socket is molded about the ball to provide a custom shape, complementary form without tolerance stack-up, which otherwise occurs when the parts are produced independently and subsequently assembled, as in the prior art.

The ball and socket joints manufactured according to the processes of the present invention have more consistent performance from part to part and thus comply more consistently with desired performance specifications.

Figure 2:
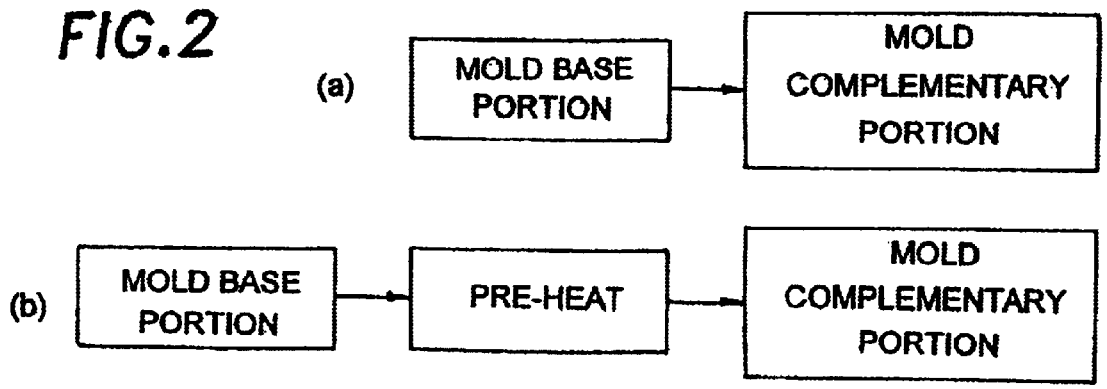
FIGS. 2a and 2b are process flow diagrams for the present invention.

In the general process flow diagram of FIG. 2a, a base portion comprising either the ball or the socket is formed initially, for example in a molding operation. In a subsequent operation, a complementary portion is formed relative to the base portion, for example the socket is molded about the ball or the ball is molded about the socket.

The ball and socket are both preferably formed of plastic materials in molding operations. Forming both parts of plastic materials reduces and in some cases eliminates the requirement for lubrication therebetween and reduces or eliminates corrosion that adversely affects metal components.

In one embodiment, the ball and socket are formed of the same plastic materials. In other embodiments, however, it may be desirable to use different materials for the ball and socket. For example, a plastic ball may be molded in a metal socket, or a plastic socket may be molded about a metal ball. In still other embodiments, different plastic materials may be used for the ball and socket, for example one may be a nylon material and the other component may be an acetal material.

The materials disclosed herein are only exemplary and are not intended to limit the invention. Other suitable materials are also known to those of ordinary skill in the art.

Joint performance is generally dependent on the materials from which the ball and socket are formed, since different materials have different frictional properties and tend to wear or degrade differently. Joint performance, for example the stiffness or tightness of the joint, may thus be controlled by appropriate materials selection.

In embodiments where the both the ball and socket are formed of moldable plastic materials, the over-molded, or later formed, complementary plastic portion may have a higher or lower or the same melting temperature as the first formed plastic portion.

Surprisingly, joints may be produced by over-molding the same or similar moldable materials without bonding between the ball and socket. Moreover, ball and socket joints may be produced by molding higher melt temperature materials over lower melt temperature materials without bonding therebetween. These results are unexpected.

In FIG. 1, the stud 50 is metal and has a metal knob 52 on an end thereof about which a plastic ball is molded, for example by insert molding. The knob is preferably shaped generally spherically so that a spherical ball formed thereabout has a substantially uniform thickness.

In FIG. 1, the exemplary sockets 30 and link body 20 are formed by molding plastic about a rigid, preferably metal substrate 22 having openings at its end portions (only one of which is illustrated in the sectional view). The sockets are molded in the openings of the substrate. The exemplary sockets 30 and link body 20 are preferably molded as a unitary member, and the metal substrate 22 is captured therein, for example by insert molding.

In other embodiments, portions of the plastic socket 30 and link body 20 may be molded separately as discrete components that are later assembled about the substrate 22 and fastened together, for example by sonic welding or other means.

In FIG. 1, the substrate 22 comprises a flange or ring 24 disposed about the opening and extending axially from one side thereof. The ring 24 provides strength and support for the socket and may influence joint performance, depending on its axial dimension and proximity to the socket. In FIG. 1, for example, joint friction tends to be increased by increasing the axial dimension of the ring 24 from the substrate in the direction of the stud 50.

In some embodiments, the metal stud 50 and the metal substrate 22 function as heat sinks during molding of the respective parts thereabout. In some embodiments, the knob 52 and substrate 22 reduce shrinkage of plastic components molded thereabout.

In some modes of manufacture, it is desirable to preheat the initially formed portion prior to molding the complementary portion therein or thereabout. With reference to FIG. 2b, preheating the first or initially formed joint portion may, for example, increase or decrease the joint tightness or friction, depending upon whether the preheated portion is the ball or the socket.

In FIG. 1, an alternative flexible sealing boot 80, shown sectionally, is disposed about the stud 50 and over the socket opening to prevent contamination of the joint, as is known generally. In FIG. 3, boots 80 are similarly disposed about opposite end portions of the sleeve 60 and over corresponding openings of the socket 32.

Manufacturing the ball and socket joint according to the processes of the present invention may substantially reduce joint contamination, depending on the tightness of the joint, and in some applications may eliminate the requirement for joint sealing boots.

In another alternative embodiment suitable for some applications, the ball and socket have complementary alignment members formed thereon, which facilitate alignment or realignment of the joint to some desired position or configuration.

Figure 4:
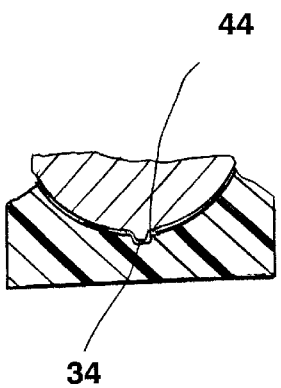
FIG. 4 is another alternative embodiment of the invention.

In the exemplary embodiment of FIG. 4, the ball has a protrusion 34 thereon, and the socket has a complementary recess 44 formed therein and into which the protrusion 34 of the ball seats when the ball and socket are aligned. The protrusion on the ball may be a gate vestige of the molding operation in embodiments where the ball is molded, and the recess may be formed on the socket when the socket is molded about the ball. In alternative embodiments, the protrusion may be disposed on the socket and the recess may be disposed on the ball, for example where the ball is molded in the socket.

Figure 6:
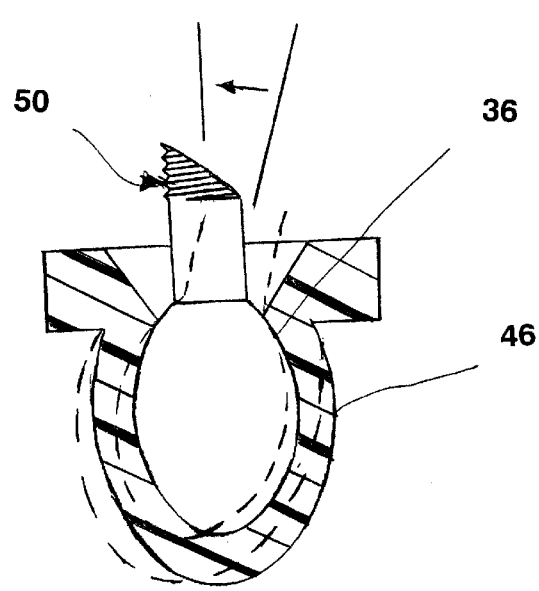
FIG. 6 is a partial sectional view of another alternative embodiment of the invention.

In another embodiment, the ball and socket have complementary, aspherical shapes that tend align themselves in a particular relationship or configuration. In FIG. 6, for example, the ball 36 has an aspherical shape that is symmetrical about the axis of the stud 50 and the socket 46 has a complementary shape. The socket is formed preferably of a resilient plastic material that when deformed, for example by pivoting the ball from some initial position, will tend to flex back toward its undeformed state or configuration, thereby returning the ball toward the initial position.

Figure 5:
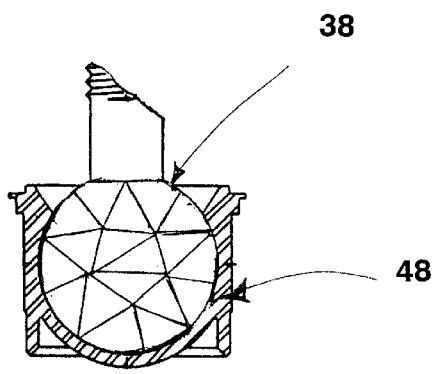
FIG. 5 is a partial sectional view of a faceted ball and socket.

In another embodiment, the plastic ball and socket have complementary surface configurations that permit relative movement therebetween in discrete intervals. In FIG. 5, for example, the ball 38 is faceted over its outer surface, and the socket 48 has complementary facets formed on its inner surface, for example when the socket is molded about the faceted ball. In an alternative embodiment, one of the plastic ball and socket has a plurality of dimples thereon and the other of the socket and ball has corresponding complementary protrusions thereon, similar to those illustrated in FIG. 4.

The particular joint configuration and materials used therefor depend on the performance requirements desired for the intended application and may readily be determined by those having ordinary skill in the art without undue experimentation.

While the foregoing written description of the invention enables one of ordinary skill to make and use what is considered presently to be the best mode thereof, those of ordinary skill will understand and appreciate the existence of variations, combinations, and equivalents of the specific exemplary embodiments herein. The invention is therefore to be limited not by the exemplary embodiments herein, but by all embodiments within the scope and spirit of the appended claims.

What is claimed is:

1. A method of making a vehicle control link comprising:
   providing a stud having a ball connecting member;
   molding a plastic ball over the ball connecting member;
   molding a plastic socket about the plastic ball such that the plastic ball is pivotally disposed and retained within the plastic socket; and
   simultaneously with molding the plastic socket about the plastic ball, molding the plastic socket within an opening on an end of a metal link body.

2. The method of claim 1, wherein the ball connecting member is a metal knob on an end of the stud, and further includes molding the plastic ball with a substantially uniform thickness about the knob.

3. The method of claim 1, wherein the plastic ball is first preheated and then the plastic socket is molded thereover.

4. The method of claim 1, forming the ball having a protrusion thereon by molding the ball from a plastic material, forming a complementary recess into which the protrusion of the ball extends on the plastic socket during molding thereof about the plastic ball.

5. The method of claim 1, forming the ball having facets on a surface thereof, forming complementary facets on the plastic socket during the molding thereof about the plastic ball.

6. The method of claim 1, forming the ball having one of a plurality of dimples or protrusions on a surface thereof, forming a plurality of complementary protrusions or dimples on the plastic socket during the molding thereof about the plastic ball.

7. The method of claim 1, forming the plastic ball with an aspherical shape symmetrical about an axis of the stud, forming a complementary aspherical socket during the molding thereof about the plastic ball.

8. The method of claim 1, forming the ball by molding it from the same material as the plastic socket.

9. The method of claim 1, forming the ball by molding it from a plastic material that is different from the plastic material of the socket.

10. The method of claim 1, molding the socket of a plastic material having a melting temperature greater than a melting temperature of the plastic ball.

11. The method of claim 1, wherein the plastic ball is molded within the plastic socket, and the plastic socket is molded within the end of the metal link body.

12. The method of claim 1, preheating the socket before disposing the ball therein.

13. The method of claim 12, forming the socket by molding it of a plastic material having a lower melting temperature than a melting temperature of the plastic ball.

14. The method of claim 1, wherein the end of the metal link body is in the shape of an annular ring, the ring surrounding the plastic socket.

15. The method of claim 1, wherein the ball connecting member is a metal stud having a knob on an end thereof, the plastic ball being molded about the knob, wherein the control link further comprises a resilient boot disposed about and coupled to the stud and the link body about the socket.

* * * * *